United States Patent Office 3,531,321
Patented Sept. 29, 1970

3,531,321
IMPREGNATING COILS, WINDINGS OR INSULATING MATERIALS WITH DIGLYCIDYL-O-PHTHALATE OF HIGH EPOXIDE CONTENT AND CURING
Hans Batzer, Arlesheim, Karl Metzger, Aesch, Ulrich Niklaus, Muenchenstein, and Alfred Heer, Basel, Switzerland, assignors to Ciba Limited, Basel, Switzerland, a company of Switzerland
No Drawing. Filed Apr. 2, 1968, Ser. No. 718,245
Claims priority, application Switzerland, Apr. 10, 1967, 5,084/67; Aug. 4, 1967, 11,013/67
Int. Cl. H01b 3/40; B32b 27/38; B44d 1/36
U.S. Cl. 117—232                           1 Claim

ABSTRACT OF THE DISCLOSURE

The invention relates to diglycidyl-o-phthalate having an epoxide content of at least 5.5 epoxide equivalents/kg. It is used in curable compositions, especially impregnating compositions, conjointly with usual curing agents for epoxy resins.

---

Glycidyl phthalates are known, and have been described several times, in the literature (compare for example German patent specification No. 968,500, British patent specifications Nos. 766,771 and 884,033 as well as U.S. patent specifications Nos. 3,053,855 and 3,073,803). All examples in the literature have low epoxide contents (33–71.3% of theory). These products, to the extent that they cannot be improved by a purification operation entailing heavy losses, have inadequate properties for most technical purposes. In general such products either exhibit a high chlorine content whose level is inversely proportional to the epoxide content, which is detrimental to the electrical properties, or they have a high hydroxyl content or even unreacted acid groups, so that the storage stability and the pot life of the mixture which is ready for processing is shortened in an unacceptable manner. One is also frequently dealing with badly defined, higher molecular, condensed products which have a high viscosity and a dark colour. Commercially, such a diglycidyl phthalate was for a time offered as an adhesive, in the form of a deep brownish black resin which was viscous at room temperature and contained approximately 3.5 epoxide equivalents/kg., but has since been again withdrawn from the market.

It has now been found that a diglycidyl-o-phthalate having an epoxide content of at least 5.5 epoxide equivalents/kg. (theoretical value: 7.18 epoxide equivalents/kg.=11.5% epoxide oxygen) has a series of surprising technical advantages over the previously known diglycidyl-o-phthalate of low epoxide content.

As a result of the higher purity the viscosity increase on storage is very slight. A sample of diglycidyl-o-phthalate containing, for example, 6.70 epoxide equivalents/kg. and having an initial viscosity of 660 cp. at 25° C. had a viscosity of 810 cp. at 25° C. after 24 hours storage at 120° C., and a viscosity of 1090 cp./25° C. after 48 hours at 120° C. The epoxide content had fallen to 6.31 epoxide equivalents/kg. during the course of this test. Less pure samples gel on receiving the same treatment, depending on the epoxide content, and amount and nature of the impurities, within hours or even fractions thereof even without the addition of a curing agent.

Furthermore curable mixtures of diglycidyl-o-phthalate of high epoxide content and the usual curing agents for epoxide resins, such as especially polycarboxylic acid anhydrides, are distinguished by a high pot life at about 60–80° C.; at 120° C. the mixture gels within a short time ("latent system"), which is a very highly desirable property in processing technology.

A diglycidyl-o-phthalate containing 6.70 epoxide equivalents/kg. (100 parts by weight), when mixed with the quantities of curing agent and accelerator given below, for example exhibits the following pot lives (viscosity rise of the resin/curing agent mixture to 1500 cp. at the temperature specified, measured in a Hoppler viscometer) and gel times:

| Curing agent (100 parts by weight) | Accelerator | Parts by weight | Pot life, 80° C. (mins.) | Gelling time, 120° C. (mins.) |
|---|---|---|---|---|
| Hexahydrophthalic anhydride | Na-hexanetriolate [1] | 6 | 720–900 | 70–80 |
| Hexahydrophthalic anhydride | Benzyldimethylamine | 0.2 | 240–300 | 20–30 |
| Methyl-nadicanhydride [2] | 2-ethyl-4-methylimidazole | 0.2 | 300 | 40 |

[1] Manufactured by dissolving 0.82 part by weight of sodium metal in 100 parts by weight of 2,4-dihydroxy-3-hydroxymethylpentane at 120° C.
[2] Methyl-endomethylene-tetrahydrophthalic anhydride.

Because of the low viscosity the system can furthermore be extended to a greater extent. An epoxide resin/anhydride curing agent mixture provided with 200% of filler (quartz flour) can still be cast perfectly, whilst an otherwise analogous system which instead of a diglycidyl-o-phthalate of 6.70 epoxide equivalents/kg. contains a diglycidyl-o-phthalate of merely 3.27 epoxide equivalents can only be filled to the extent of 115%.

The subject of the present invention is accordingly a diglycidyl-o-phthalate having an epoxide content of at least 5.5 epoxide equivalents/kg., and preferably an epoxide content of at least 6.0 epoxide equivalents/kg. The new substance is a yellowish liquid of low viscosity, of about 500–700 cp. at 20° C., which at epoxide contents of more than 90% of theory (6.5 epoxide equivalents/kg.) tends to crystallise. The crystals again melt in the liquid component at around 40° C. so that no disadvantages as regards processing technology result.

The diglycidyl-o-phthalate of high epoxide content can be cured by means of the usual curing agents for epoxide resins, for example polycarboxylic acid anhydrides such as phthalic anhydride, or polyamines such as diethylene triamine, to give infusible and insoluble products which possess excellent mechanical and electrical properties and which can therefore find extensive applications in commerce and technology. Thus curable mixtures of diglycidyl phthalate and curing agents together with optionally further additives such as active diluents, plasticisers, pigments, extenders and fillers, can serve as paints, lacquers, dipping resins, casting resins, impregnating resins, laminating resins, compression moulding compositions, potting compositions and insulating compositions in the electrical industry as well as adhesives. Because of its low initial viscosity, low viscosity increase on storage and high pot life in combination with the usual curing agents, even at higher temperatures of about 60°–80° C., the diglycidyl-ortho-phthalate of high epoxide content is particularly outstandingly suitable for use as an impregnating resin, for example in the pore-free impregnation of coils, windings of electrical machinery or insulating systems using glass fibre fabrics or other materials as the carrier.

The diglycidyl-o-phthalate of high epoxide content may furthermore be employed as a reactive diluent for other known epoxide resins, such as for example polyglycidyl ethers of polyphenols such as bisphenol A (=bis(p-hydroxy-phenyl) dimethylmethane).

The subject of the present invention is therefore also curable mixtures or moulding compositions which serve for the manufacture of shaped articles such as castings or transfer-moulded or compression-moulded articles, or of two-dimensional structures such as lacquer films or adhesive bonds and which are characterised in that they contain (1) a diglycidyl-o-phthalate having an epoxide content of at least 5.5 epoxide equivalents/kg. and preferably an epoxide content of at least 6.0 epoxide equivalents/kg. and (2) a curing agent for epoxide resins.

The invention further also relates to a process for the manufacture of shaped articles by reacting phthalic acid diglycidyl esters with the usual curing agents for epoxide resins, characterised in that diglycidyl esters of o-phthalic acid having an epoxide content of at least 5.5 epoxide equivalents/kg. and preferably at least 6.0 epoxide equivalents/kg. are used.

A diglycidyl-o-phthalate of high epoxide content according to the invention was manufactured according to the following working instructions (no protection is claimed for the process of manufacture within the framework of the present application):

The apparatus consists of a reaction flask equipped with a stirrer, thermometer, dropping funnel and water separator which returns the solvent of higher specific gravity (epichlorhydrin) to the reaction flask, surmounted by a high efficiency condenser. The whole apparatus is so constructed that it can be operated under vacuum. In order to compensate pressure fluctuations it is advisable to introduce a large flask in the form of an air chamber in front of the apparatus.

166 g. of o-phthalic acid (1 mol=2 equivalents) are heated with stirring to 90° C. with 925 g. (10 mols; equivalent ratio 1:5) of technical epichlorhydrin (ECH) in the reaction flask of the apparatus described above. 20 g. of a 50% strength aqueous solution of tetramethylammonium chloride were introduced at this temperature, thereby initiating an exothermic but easily controllable reaction. The temperature is allowed to rise to about 95° C, and kept at between 92–94° C. until the reaction has subsided. The course of the addition is controlled by means of a pH-electrode. The pH-value is initially 1, is 3.5 after the addition of the catalyst, then rises over the course of the reaction, reaches 6.5 after 15 minutes reaction time and then very rapidly changes over into the alkaline region. After a further 2 minutes a pH of 9.9 is already recorded. The pH-electrode is removed, a dropping funnel containing 200 g. (2.5 mols=25% excess) of 50% strength aqueous sodium hydroxide solution is fitted and a further 3.2 g. of a 50% strength catalyst solution are metered in. The apparatus is subjected to a vacuum, whereupon ECH begins to distil and water begins to separate from the reaction mixture. The sodium hydroxide solution is introduced dropwise at a constant internal temperature of 60° C., corresponding to an initial pressure of 140–150 mm. Hg, whereupon the water introduced and the water formed are azeotropically distilled off together with ECH. The speed of introduction is so adjusted that the reaction time is 90 minutes. The ECH freed of water is continuously returned into the reaction mixture. During the addition of the sodium hydroxide solution the vacuum has to be slowly improved and is 90–100 mm. Hg towards the end of the reaction. 140–150 ml. of water are separated off.

For working-up, air is introduced into the apparatus and 600 ml. of water added to the reaction mixture, the common salt which has separated out is dissolved by stirring, and the aqueous phase is separated off in a separating funnel. The organic phase is twice washed with 200 ml. of sodium hydroxide solution (2.5% strength) at a time, once with saturated monosodium phosphate solution and further twice with water. ECH is distilled off in a rotational evaporator connected to a waterpump and the residue is dried for 30 minutes at 70° C. in a high vacuum.

224 g. of a pale yellow product of low viscosity (viscosity about 600 cp, at 25° C.) are obtained, corresponding to a bulk yield of 80.5% of theory. The epoxide content is 6.94 epoxide equivalents/kg.=96.4% of theory and the chlorine contents 0.72%. (Percentages in the above working instruction always denote percentages by weight).

EXAMPLE 1

100 g. of diglycidyl-o-phthalate having an epoxide content of 6.65 epoxide equivalents/kg., a hydroxyl content of 0.24 equivalents/kg. and a total chlorine content of 1.2% were combined with 100 g. of hexahydrophthalic anhydride as the curing agent and 6 g. of a sodium alcoholate acting as a cure accellerator (manufactured by dissolving 0.82 part by weight of sodium metal in 100 parts by weight of 2,4-dihydroxy-3-hydroxymethylpentane) at 80° C. to give a casting resin composition and were cast at this temperature into aluminum moulds (40 x 10 x 140 mm.). The composition was cured for 4 hours at 80° C. and 16 hours at 120° C. to give castings.

The following Table I gives the temperature dependence of the dielectric loss factor $tg\delta$ (50 c./s.) and of the dielectric constant $\epsilon$ for a cured casting.

TABLE I

| Temperature, °C. | $tg\ \delta\ \times 10^{-2}$ | $\epsilon$ |
| --- | --- | --- |
| 20 | 0.6 | 3.8 |
| 40 | 0.4 | 3.8 |
| 60 | 0.3 | 3.8 |
| 80 | 0.4 | 3.8 |
| 100 | 0.8 | 3.9 |
| 110 | 3.3 | 4.2 |
| 121 | 10.0 | 4.9 |

Further mechanical and electrical properties of the resulting castings are given in Table II at the end of Examples 1–4.

EXAMPLE 2

Eactly the same procedure as in Example 1 was followed but with the difference that instead of the alcoholate benzyldimethylamine (0.2 g.) was employed as the accelerator.

The properties of the castings are given in Table II at the end of Examples 1–4.

EXAMPLE 3

A mixture of 100 g. of diglycidyl-o-phthalate, 100 g. of hexahydrophthalic anhydride, 6 g. of the sodium alcoholate described in Example 1 and 400 g. of quartz flour "K8" was cast into plaque moulds (134 x 134 x 3 mm.) and cured for 4 hours at 80° C. and thereafter for 16 hours at 120° C. to give castings.

The properties of the castings are given in Table II at the end of Examples 1–4.

EXAMPLE 4

The same procedure as described in Example 3 was followed, with the difference that in place of the alcoholate benzyldimethylamine (0.2 g.) was employed as the accelerator.

The properties of the castings are given in Table II at the end of Examples 1–4.

TABLE II

| | Example | | | |
|---|---|---|---|---|
| | 1 | 2 | 3 | 4 |
| Heat distortion point according to Martens (DIN 53,458) °C | 103 | 99 | 110 | 121 |
| Flexural strength (VSM 77103) kg./mm.² | 17.4 | 17.2 | 13.5 | 12.7 |
| Deflection at break, mm | 15.3 | 15.1 | 5.5 | 5.3 |
| Impact strength (VSM 77105), cm.kg./cm.² | 12.3 | 10.4 | 6.9 | 5.4 |
| Tracking resistance (according to VDE 0303) | (¹) | (¹) | | |
| Tracking resistance after ageing (1 month at 180° C)(VDE 0303) | (¹) | (¹) | | |
| Arcing resistance (according to VDE 0303) | (²) | (²) | | |

¹ Level KA 3c.
² Level L 4.

EXAMPLE 5

(a) The following epoxide resin mixtures A and B were manufactured:

Resin Mixture A (state of the technology)

100 parts by weight of a commercially available bisphenol-A-polyglycidyl ether manufactured by condensation of epichlorhydrin with bisphenol A[=2,2-bis-(p-hydroxyphenyl)propane] in the presence of alkali, which is liquid at room temperature and has an epoxide content of 5.3 epoxide equivalents per kg., are mixed with 70 parts by weight (=0.87 mol) of hexahydrophthalic anhydride as the curing agent.

Resin Mixture B (according to the invention)

100 parts by weight of the diglycidyl-ortho-phthalate described in Example 1, having an epoxide content of 6.65 epoxide equivalents/kg., are mixed with 95 parts by weight (=0.95 mol) of hexahydrophthalic anhydride.

The following Table III compares the viscosities at 25° C. and the pot lives of the two resin mixtures at various temperatures.

TABLE III

| | Epoxide resin mixture | |
|---|---|---|
| Viscosity at 25° C. (Hoeppler) | A (800 cp.) | B (170 cp.) |
| Pot life (hours), up to 1,500 cp. at— | | |
| 60 °C | 48 | ¹ 72 |
| 80° C | 33 | 24 |
| 120° C | 8.5 | 1.5 |

¹ 250 cp. after 72 hours.

It follows from the results that mixture B has a much lower viscosity than mixture A and at the same time shows a reactivity characteristic of the type desired for impregnating resin mixtures. In contrast to mixture A, mixture B has a much lower reactivity at lower temperatures, whilst at higher temperatures precisely the converse conditions apply.

(b) The following procedure was adopted for impregnating coil bodies with the impregnating resin mixture B:

Solenoids (55 x 60 x 40 mm.) were dried for 10 hours at 110° C. in a vacuum kettle under a vacuum of 1 mm. Hg. A sufficient quantity of the mixture B described under (a) above was subjected to a vacuum and then allowed to run into the vacuum kettle until the solenoids to be impregnated were fully covered by the resin. The vacuum was released and after ½ an hour the solenoids were removed from the bath and the coils filled with impregnating composition were cured in a heated cabinet for 16 hours at 140° C. The excess impregnating mixture is allowed to run out of the vacuum kettle and is stored at room temperature for further impregnations.

We claim:
1. In a process for the pore-free impregnation of carrier members of coils, windings of electrical machinery or insulating materials by impregnating the carrier member in a vacuum with a mixture consisting of a liquid epoxide resin and a hardener and curing the so-impregnated carrier member out of the vacuum by heating to a temperature sufficient to cure the epoxy resin-hardener mixture, the improvement which consists in using as the epoxide resin a diglycidyl-o-phthalate having an epoxide content of at least 5.5 epoxide equivalents/kg.

References Cited

UNITED STATES PATENTS

| 2,772,296 | 11/1956 | Mueller. | |
| 2,895,947 | 7/1959 | Shokal et al. | |
| 2,970,971 | 2/1961 | Katz et al. | 117—232 |
| 3,053,855 | 9/1962 | Maerker et al. | |
| 3,060,147 | 10/1962 | Schlegel. | |
| 3,071,496 | 1/1963 | Fromm et al. | 117—232 |
| 3,073,803 | 1/1963 | Raecke et al. | |
| 3,073,804 | 1/1963 | Raecke et al. | |
| 3,075,999 | 1/1963 | June et al. | |
| 3,257,345 | 6/1966 | Bond et al. | 117—232 |
| 3,281,492 | 10/1966 | McGary et al. | |

WILLIAM D. MARTIN, Primary Examiner

R. M. SPEER, Assistant Examiner

U.S. Cl. X.R.
117—161; 260—348